US008312144B2

(12) United States Patent
Gravees et al.

(10) Patent No.: US 8,312,144 B2
(45) Date of Patent: Nov. 13, 2012

(54) METHOD, APPARATUS, AND SYSTEM FOR EXCHANGING SERVICES IN A DISTRIBUTED SYSTEM

(75) Inventors: Jason James Gravees, Tucson, AZ (US); Ivan Ronald Olguin, II, Tucson, AZ (US); Kevan D. Holdaway, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 12/361,531

(22) Filed: Jan. 28, 2009

(65) Prior Publication Data

US 2010/0191595 A1  Jul. 29, 2010

(51) Int. Cl.
*G06F 15/173* (2006.01)
(52) U.S. Cl. ........ 709/226; 709/202; 709/223; 709/227; 709/237
(58) Field of Classification Search .......... 709/226, 709/202, 223, 227, 237
See application file for complete search history.

(56) References Cited

U.S. PATENT DOCUMENTS

| 5,598,465 | A | 1/1997 | Siratori | |
|---|---|---|---|---|
| 5,850,518 | A | 12/1998 | Northrup | |
| 2005/0210387 | A1* | 9/2005 | Alagappan et al. | 715/700 |
| 2006/0253658 | A1* | 11/2006 | Mathieu et al. | 711/149 |
| 2007/0168476 | A1* | 7/2007 | Davies et al. | 709/220 |
| 2007/0184820 | A1* | 8/2007 | Marshall | 455/414.3 |
| 2007/0198398 | A1 | 8/2007 | Rios et al. | |

FOREIGN PATENT DOCUMENTS

JP       4336742 A       11/1992

OTHER PUBLICATIONS

CN201010002108.6 Office Action, Apr. 24, 2012.
Jammes, F. et al., Service-Oriented Device Communications Using the Devices Profile for Web Services, ACM Digital Library, MPAC 2005, Article No. 16.
Leong, P. et al., Peer-to-peer Autonomic Location Based Services, ACM Digital Library, Sep. 2007.
Dogag, A. et al., Semantically Enriched Web Services for the Travel Industry, ACM Digital Library, vol. 33, No. 3, Sep. 2004.

* cited by examiner

*Primary Examiner* — Lan-Dai T Truong
(74) *Attorney, Agent, or Firm* — Kunzler Law Group, PC

(57) ABSTRACT

A method, apparatus, and system are disclosed for exchanging services in a distributed system. A communication module receives an advertisement of service capabilities for a service provider. The communication module further receives a registration of service requirements for a service consumer. A match module determines if the advertisement service capabilities match the registration service requirements. A configuration module configures the service provider to supply the service requirements of the service consumer if the advertisement service capabilities match the registration service requirements. An establishment module establishes a service relationship between the service provider and the service consumer. The service provider provides the service requirements of the service consumer.

17 Claims, 6 Drawing Sheets

METHOD, APPARATUS, AND SYSTEM FOR EXCHANGING SERVICES IN A DISTRIBUTED SYSTEM

BACKGROUND

1. Field

This invention relates to exchanging services and more particularly relates to exchanging services in a distributed system.

2. Description of the Related Art

Data processing systems are frequently configured as distributed systems. A distributed system may include a number of devices, such as servers, routers, and storage devices. The distributed system may service a computing task by assigning one or more servers, routers, and storage devices to the task.

Unfortunately, the administrator typically must understand the detailed requirements and capabilities of each device in the distributed system in order to configure the distributed system to perform a specified task. For example, if the administrator wished to couple a storage device to a server, the administrator would need to know how to manage the storage device as well as understanding the storage requirements of the server in order to configure the server and storage device to exchange services.

SUMMARY

From the foregoing discussion, there is a need for a method, apparatus, and system that exchanges services in a distributed system. Beneficially, such a method, apparatus, and system would automatically match service providers with service consumers for exchanging services.

The present invention has been developed in response to the present state of the art, and in particular, in response to the problems and needs in the art that have not yet been fully solved by currently available service exchange methods. Accordingly, the present invention has been developed to provide a method, apparatus, and system for exchanging services in a distributed system that overcome many or all of the above-discussed shortcomings in the art.

A method of the present invention is presented for exchanging services in a distributed system. In one embodiment, the method includes receiving an advertisement of service capabilities, receiving a registration of service requirements, determining if the advertisement matches the registration, configuring the service provider to supply the service requirements, and establishing a service relationship.

A communication module receives an advertisement of service capabilities for a service provider. The communication module further receives a registration of service requirements for a service consumer. A match module determines if the advertisement service capabilities match the registration service requirements.

A configuration module configures the service provider to supply the service requirements of the service consumer if the advertisement service capabilities match the registration service requirements. An establishment module establishes a service relationship between the service provider and the service consumer. The service provider provides the service requirements of the service consumer.

The apparatus for exchanging services in the distributed system is provided with a plurality of modules configured to functionally execute the steps of the method. The modules include a communication module, a match module, a configuration module, and an establishment module.

The communication module receives an advertisement of service capabilities for a service provider. The communication module further receives a registration of service requirements for a service consumer. The match module determines if the advertisement service capabilities match the registration service requirements.

The configuration module configures the service provider to supply the service requirements of the service consumer if the advertisement service capabilities match the registration service requirements. The establishment module establishes a service relationship between the service provider and the service consumer. The service provider provides the service requirements of the service consumer.

A system of the present invention is also presented for exchanging services in the distributed system. The system may be embodied in a blade center. In particular, the system, in one embodiment, includes a plurality of service providers, a plurality of service consumers, and a manager.

The manager includes a communication module, a match module, a configuration module, and an establishment module. The communication module receives a plurality of advertisements of service capabilities for the plurality of service providers. The communication module further receives a plurality of registrations of service requirements for the plurality of service consumers. The match module determines if a first advertisement of service capabilities for a first service provider matches a first registration of service requirements for a first service consumer.

The configuration module configures the first service provider to supply the first service requirements of the first service consumer if the first advertisement service capabilities match the first registration service requirements. The establishment module establishes a service relationship between the first service provider and the first service consumer. The first service provider provides the service requirements of the first service consumer.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention automatically exchanges services in a distributed system by matching service requirements for a service consumer with service capabilities of the service provider. In addition, the present invention configures the service provider and establishes a service relationship between the service provider and the service consumer. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
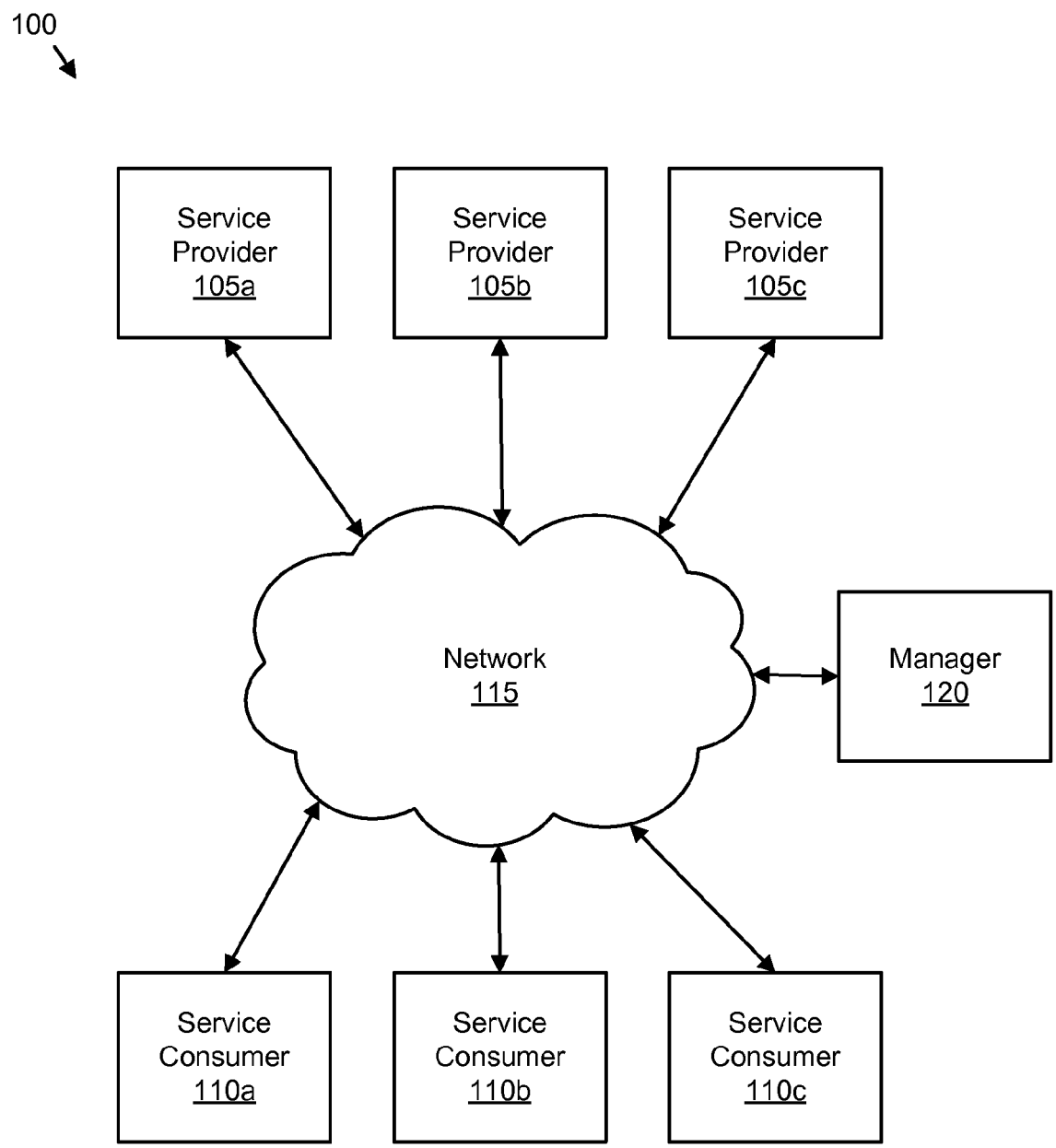
FIG. 1 is a schematic block diagram illustrating one embodiment of a distributed system in accordance with the present invention.

FIG. 1 is a schematic block diagram illustrating one embodiment of a distributed system 100 in accordance with the present invention. The system 100 includes one or more service providers 105, one or more service consumers 110, a network 115, and a manager 120.

In one embodiment, the system 100 provides computing services. For example, the service consumers 110 may be stand alone servers and the service providers 105 may be Storage Area Networks (SAN). The system 100 may be assigned a computing task. The manager 120 may direct a service consumer 110 to perform the computing task. The service consumer 110 may perform the computing task using storage from the service provider 105

Alternatively, a service consumer 110 may also provide services and a service provider 105 may also consume services. For example, a server service consumer 110 may provide a scrubbing service to a hard disk service provider 105.

The manager 120 may further associate a service provider 105 to provide a service to the service consumer 110 in performing the computing task. For example, a service provider 105 may be a storage device and may store data for the service consumer 110. The service providers 105, the service consumers 110, and the manager 120 communicate over the network 115. The network 115 may be the Internet, a Wide Area Network (WAN), a Local Area Network (LAN), token ring network, a blade center back plane, and the like.

In the past, an administrator directed the manager 122 to associate service providers 105 with service consumers 110. The administrator was required to understand the capabilities of the service providers 105 and the requirements of the service consumers 110. In addition, the administrator was required to direct the configuration of the service providers 105 and the service consumers 110 in order to perform computing tasks. The present invention automates the exchanging of services between service providers 105 and service consumers 110 in the distributed system 100 as will be described hereafter.

Figure 2:
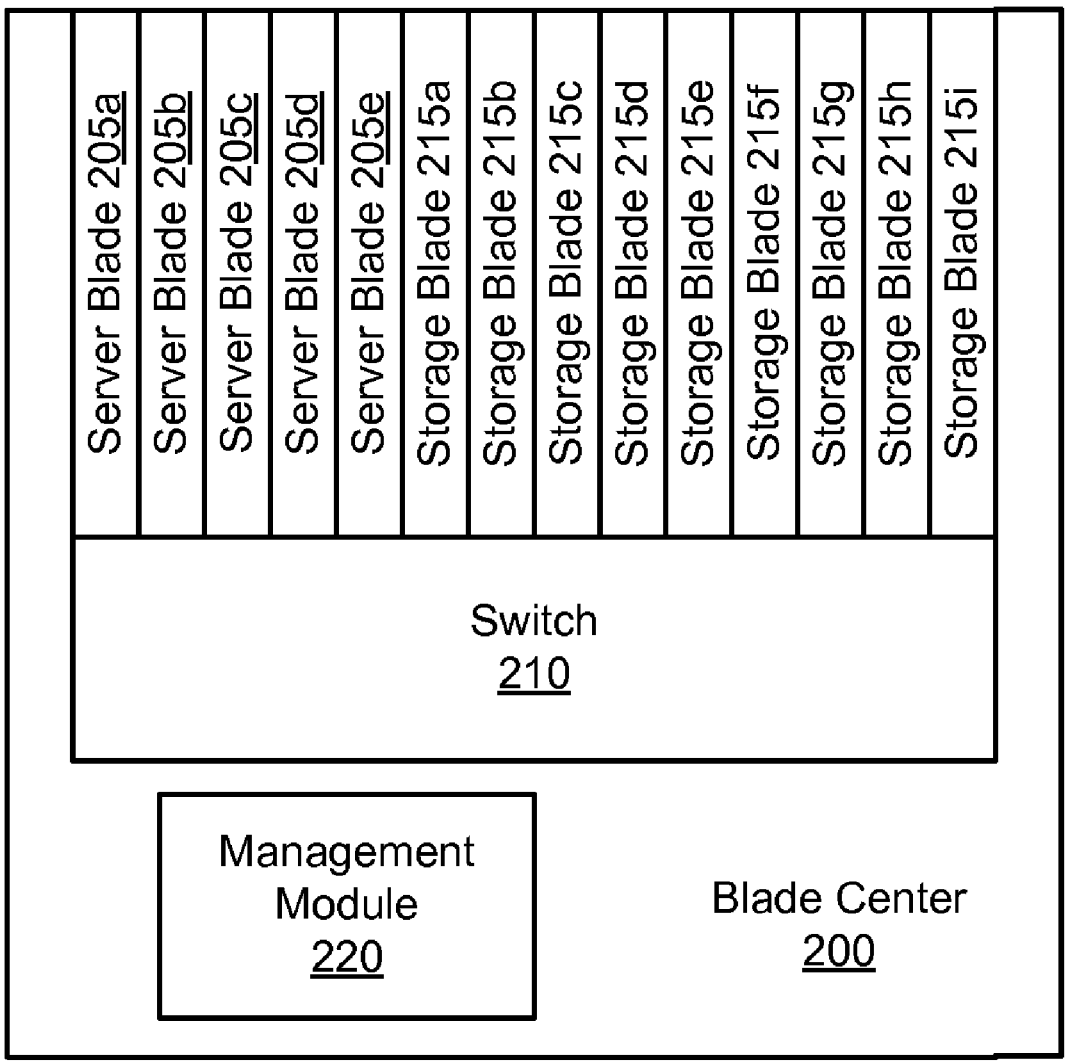
FIG. 2 is a schematic block diagram illustrating one embodiment of a blade center of the present invention.

FIG. 2 is a schematic block diagram illustrating one embodiment of a blade center 200 of the present invention. The blade center 200 is one embodiment of the distributed system 100 of FIG. 1. One of skill in the art will recognize that the distributed system 100 may be embodied in other configurations. The blade center 200 includes one or more blade servers 205, a switch 210, one or more storage blades 215, and a management module 220. The description of the blade center 200 refers to elements of FIG. 1, like numbers referring to like elements.

In one embodiment, the management module 220 is the manager 120 of FIG. 1. The manager module 220 manages the blade center 200. For example, the manager module 220 may receive computing tasks from a host (not shown). The computing tasks may include hosting a database, hosting a website, and the like. The manager module 220 may assign specific computing tasks to the server blades 205.

The server blades 205 perform computational services. In addition, the server blades 205 may include local storage. In one embodiment, the server blades 205 are also consumers of storage services. For example, the storage blades 215 may store data for one or more server blades 205. The server blades 205, storage blades 215, and management module 220 may communicate through the switch 210. The switch 210 may be the network 115 of FIG. 1. In one embodiment, the switch 210 is a non-blocking switch.

A blade server 205 may require the use of one or more storage blades 215 to perform an assigned computing task. The present invention automates the exchange of services between storage blades 215 and server blades 205 as will be described hereafter.

Figure 3:
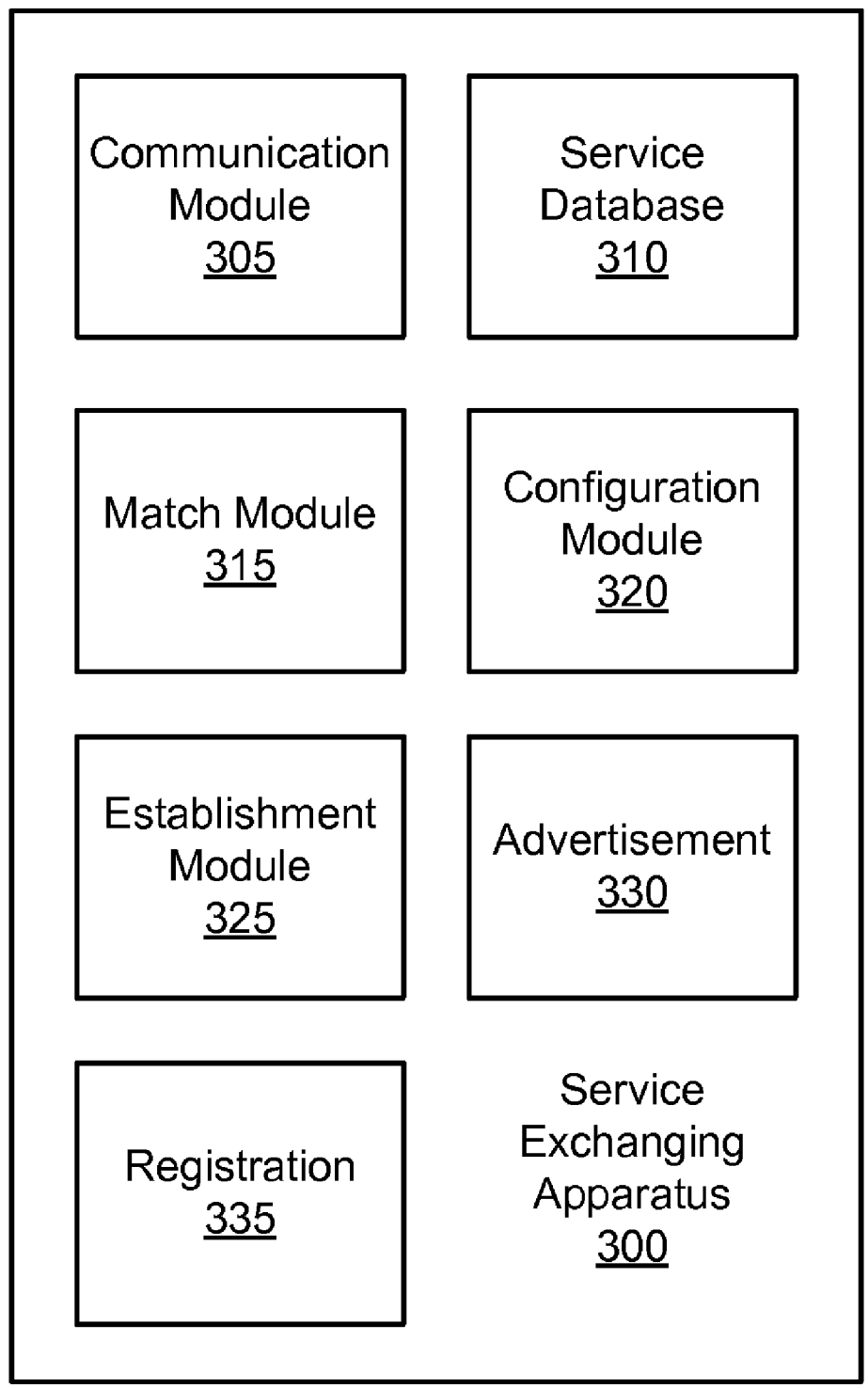
FIG. 3 is a schematic block diagram illustrating one embodiment of a service exchanging apparatus of the present invention.

FIG. 3 is a schematic block diagram illustrating one embodiment of a service exchanging apparatus 300 of the present invention. The apparatus 300 may be embodied in the manager 120 of FIG. 1. Alternatively, the apparatus 300 may be embodied in the management module 220 of FIG. 2. The description of the apparatus 300 refers to elements of FIG. 1-2, like numbers referring to like elements. The apparatus 300 includes a communication module 305, a service database 310, a match module 315, a configuration module 320, an establishment module 325, an advertisement 330, and a registration 335. The communication module 305, service database 310, match module 315, configuration module 320, establishment module 325, advertisement 330, and registration 335 may be embodied in a computer readable storage medium storing a computer readable program that is executed on a processor of a computer such as a server, the management module 220, the manager 110, or the like.

The communication module 305 receives the advertisement 330. The advertisement 330 may comprise a listing of service capabilities for a service provider 105. The communication module 305 may further receive the registration 335. The registration 335 may comprise a listing of service requirements for a service consumer 110. In one embodiment, the communication module 305 stores the advertisement 330 of service capabilities and the registration 335 of service requirements in the service database 310.

The match module 315 determines if the advertisement service capabilities match the registration service requirements. If the advertisement service capabilities match the registration service requirements, the configuration module 320 configures the service provider 105 to supply the service requirements of the service consumer 110. In addition, the establishment module 325 establishes a service relationship between the service provider 105 and the service consumer 100. For example, the establishment module 325 may establish a service relationship between a first service provider 105a and a first service consumer 110a. The first service provider then 105a provides the service requirements of the first service consumer 110a.

Figure 4:
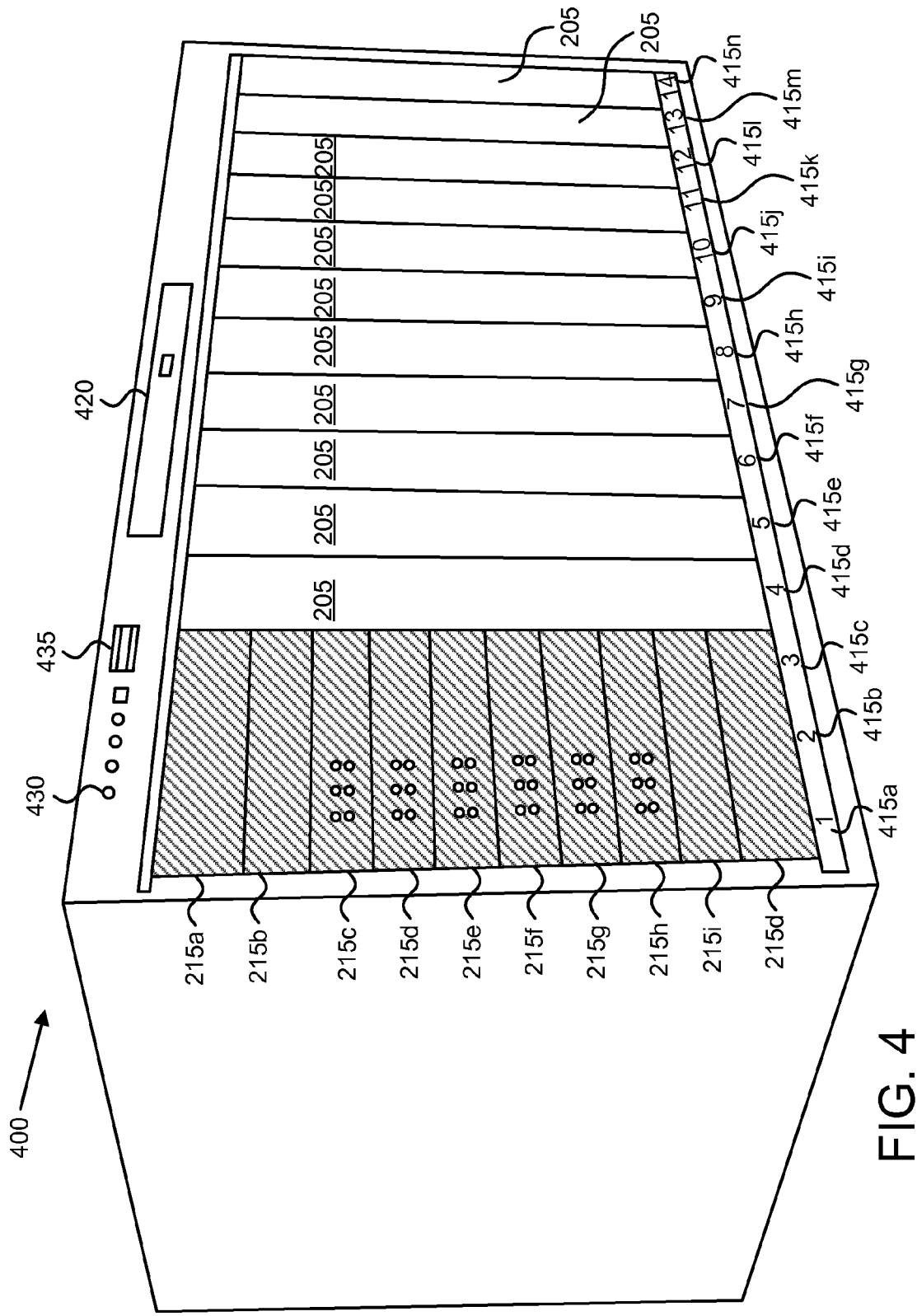
FIG. 4 is a perspective drawing illustrating one embodiment of a blade center of the present invention.

FIG. 4 is a perspective drawing illustrating one embodiment of a blade center 400 of the present invention. The blade center 400 may be the blade center 200 of FIG. 2. Note that the blade center 400 shown is not to scale, but is intended to demonstrate possible physical relationships between blade center components. The blade center 400 may be similar to a BladeCenter manufactured by International Business Machines Corporation (IBM) of Armonk, N.Y. The description of the blade center 400 refers to elements of FIGS. 1-3, like numbers referring to like elements.

The blade center 400 includes, in one embodiment, fourteen (14) slots 415. A first, second, and third slot 415a, 415b, 415c are occupied by the storage blades 215 as indicated by the cross hatching. Slots four through fourteen 415d-m are filled with server blades 205. The blade center 400 typically is rack mounted but may also be a standalone device. Rack mounting hardware is not shown.

The server blades 205 and storage blade 215 mount in the blade center 400 by sliding into the slots 415. In addition to server blades 205 and storage blades 215, other types of blades such as communication blades may mount in the slots 415. The blades 205, 210 typically connect to power couplings and interface buses. The interface buses may be used for data transfer, blade management, blade monitoring, and the like. The blades 205, 210 may also be connected with cables to other devices.

The blade center 400 may also include one or more indicator lights and/or buttons 430. The blade center 400 is also shown with one or more universal serial bus connections 435. The blade center 400 may also include other connections such as a serial port, parallel port, FireWire® connection, wireless connection, and the like. The blade center 400 may also include devices for removable storage media such as a compact disk drive 420. In addition, the blade center 400 may also include other removable storage media such as tape drives, optical drives, floppy drives, and the like (not shown). The blade center 400 may also include other user interface and management controls, indicators, and equipment. One of skill in the art will recognize other controls, indicators, connections, removable storage media, and equipment suitable for a blade center 400.

The server blades 205 are advantageous because of their compact size, reliability, and ease of administration, replacement, upgrade, and addition. Adding the storage blade 215 to a blade center 400 extends the advantages of size and ease of administration to storage subsystems. The storage blade 215 also provides a convenient system-in-a-box solution for small businesses or others that may desire a blade center 400 with server blades 205 mounted in only some of the slots 415. The storage blade 215 in the blade center 400 may also be desirable for larger computer systems where users want to conserve space and/or reduce cabling.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
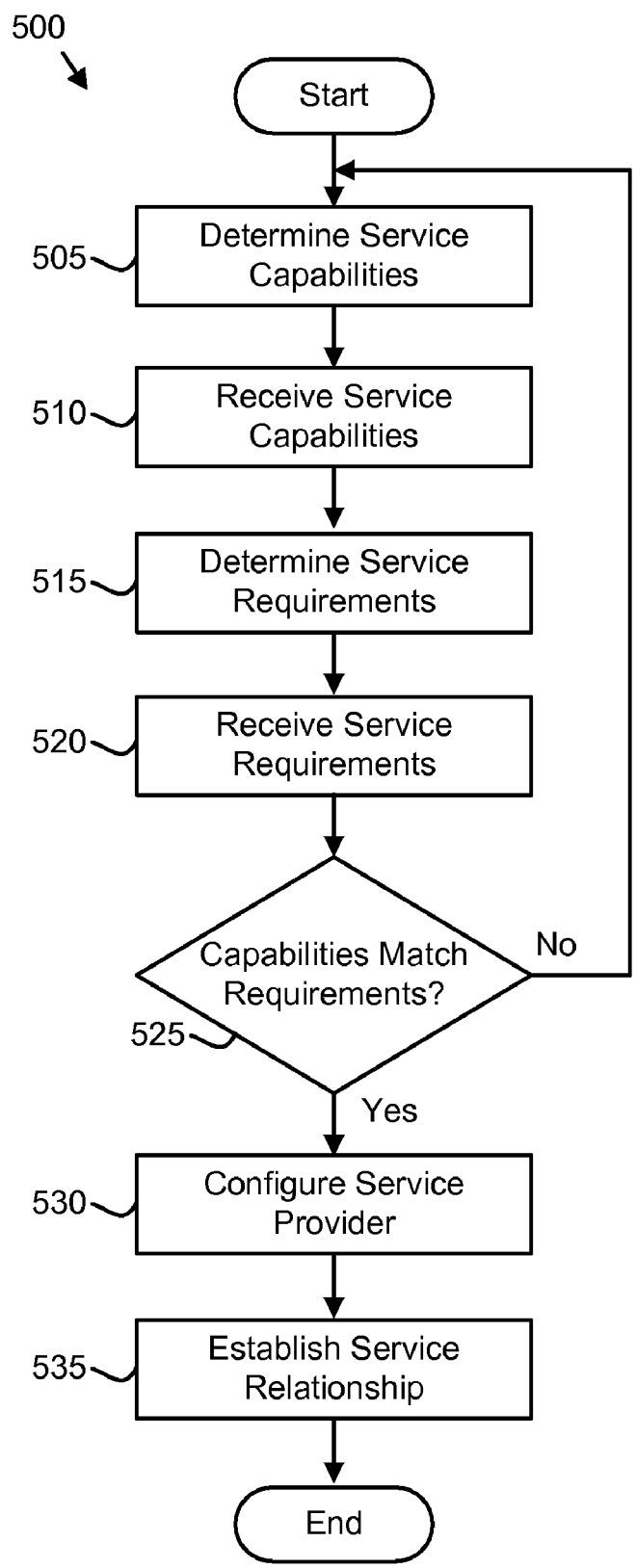
FIG. 5 is a schematic flow chart diagram illustrating one embodiment of a service exchanging method of the present invention.

FIG. 5 is a schematic flow chart diagram illustrating one embodiment of a service exchanging method 500 of the present invention. The method 500 substantially includes the steps to carry out the functions presented above with respect to the operation of the described apparatus and systems of FIGS. 1-4. In one embodiment, the method 500 is implemented with a computer readable storage medium comprising a computer readable program stored on a tangible storage device. The computer readable storage medium may be integrated into a computing system, such as the manager 120 or management module 220, wherein the computer readable program executed by the computing system performs the method 500.

The method 500 starts, and in one embodiment, the communication module 305 determines 505 the service provider's service capabilities. Although for simplicity the method is described for a single service provider 105 and a single service consumer 110, one of skill in the art will recognize that the method 500 may be practiced with a plurality of service providers 105 and a plurality of service consumers 110. In one embodiment, the communication module 305 queries the service provider 105 to determine the service provider's service capabilities.

Alternatively, the manager 120 may query the service provider 105 for an identifier. The manager 120 may further use the service provider identifier to query a database of service capabilities.

In one embodiment, the communication module 305 receives 510 an advertisement 330 of the service capabilities for the service provider 105. The advertisement 330 may be communicated to the communication module 305 from the service provider 105 in response to the communication module's query. Alternatively, the advertisement 330 may be communicated to the communication module 305 from the database of service capabilities.

In one embodiment, the service consumer 110 determines 515 service requirements for the service consumer 110. The service consumer 110 may determine 515 the service requirements in response to receiving a computing task. Alternatively, the communication module 305 queries the service consumer 110 for the service requirements. The communication module 305 receives 520 a registration 335 of the service requirements from the service consumer 110. For example, the service consumer 110 may determine 515 that the service consumer 110 requires one Terabyte of storage and communicate the service requirement for one Terabyte of storage in the registration 335 to the communication module 305.

In one embodiment, the communication module 305 stores the advertisement 330 of service capabilities and the registration 335 of service requirements in the service database 310. The service database 310 may include a table of service requirements and the table of service capabilities. In one embodiment, the service database 310 comprises a plurality of specialized tables. For example, the service database 310 may include a table of storage service requirements, a table of communication service requirements, a table of computing service requirements, and the like. In addition, the service database 310 may include a table of storage service capabilities, a table of computing service capabilities, and a table of communication service capabilities.

The match module 315 determines 525 if the advertisement service capabilities of the service provide 105 match the registration service requirements of the service consumer 110. In one embodiment, the match module 315 compares each service requirement in the list of service requirements from the registration 335 to each service capability in the list of service capabilities from the advertisement 330. If each service requirement is satisfied by a service capability, the match module 315 may determine 525 that the advertisement service capabilities match the registration service requirements.

If the advertisement service capabilities do not match the registration service requirements, the method 500 loops to determine 505 service capabilities. If the advertisement service capabilities match the registration service requirements, the configuration module 320 configures 530 the service provider 105 to supply the service requirements of the service consumer 110.

In one embodiment, the configuration module 320 allocates one or more logical volumes in a storage device service provider 105 for the service consumer 110. In addition, the configuration module 320 may establish one or more pathways through the network 115 between the service provider 105 and the service consumer 110. Alternatively, the configuration module 320 may configure a path through the switch 210 between a storage blade 215 and a server blade 210.

In addition, if the advertisement service capabilities match the registration service requirements, the establishment module 325 establishes 535 a service relationship between the service provider 105 and the service consumer 110. In one embodiment, the establishment module 325 notifies the service consumer 110 that the service provider 105 will provide the requested service. In addition, the establishment module 325 may direct the service provider 105 to provide the requested service to the service consumer 110.

For example, the service consumer 110 may be a server blade 205 and the service provider 205 may be a storage blade 215. The configuration module 320 may allocate a logical volume on the storage blade 215. In addition, the configuration module 320 may establish a plurality of paths through the switch 210 between the server blade 205 and the storage blade 215. The establishment module 325 may notify the server blade 205 that the storage blade 215 will provide the server blade's required storage. In addition, the establishment module 325 may direct the storage blade 215 to allow the server blade 205 to access the newly allocated logical volume.

Figure 6:
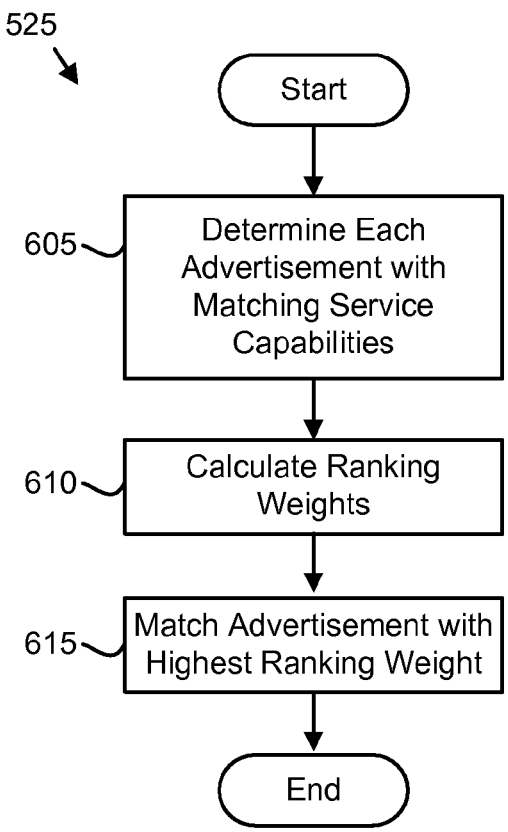
FIG. 6 is a schematic flow chart diagram illustrating one embodiment of a matching method of the present invention.

FIG. 6 is a schematic flow chart diagram illustrating one embodiment of a matching method of the present invention. The method 600 substantially includes the steps to carry out the determination of a match described for step 525 of FIG. 5. In one embodiment, the method 600 is implemented with a computer readable storage medium comprising a computer readable program stored on a tangible storage device. The computer readable storage medium may be integrated into a computing system, such as the manager 120 or management module 220, wherein the computer readable program executed by the computing system performs the method 600.

The method 600 starts, and in one embodiment the match module 315 determines each advertisement 330 of a plurality of advertisements 330 with service capabilities that match the service requirements of a registration 335. For example, the service database 310 may store advertisements 330 with service capabilities from a plurality of service providers 105. The match module 315 may compare the service capabilities of each advertisement 330 with service requirements from the registration 335 and flag each advertisement 330 with matching service capabilities.

In one embodiment, the match module 315 calculates a weight W for each matching advertisement 330 using Equation 1, wherein $V_i$ is one (1) for an ith service requirement if a version of a service capability corresponding to the ith service requirement is compatible with the ith service requirement and zero (0) if the version of a service capability is not compatible with the ith service requirement, and where $K_i$ is a constant.

$$W = \Sigma K_i * V_i \qquad \text{Equation 1}$$

Alternatively, $V_i$ may be the difference between the ith service capability and a corresponding service requirement. For example, if the ith service requirement is 64 Gigabytes (GB) and the corresponding service capability is 72 GB, $V_i$ may be 8 GB. In one embodiment, the weight W must exceed a service threshold for an advertisement 330 to be a matching advertisement.

The match module 315 may further calculate a ranking weight for each matching advertisement 330 using the priority ranking. In one embodiment, the ranking weight P is calculated using Equation 2, where N is a number of service consumers 105 waiting for service requirements, R is a registration position for a first service consumer 105a in a queue of service consumers 105 requesting services, and F is a frequency of successful requests by any service consumer 105 in the queue for services.

$$P = (N+1) - R + 0.1^{-1/(1+F)} \qquad \text{Equation 1}$$

For example, when a service consumer 105 communicates a registration 335 of service requirements, the registration 335 may be placed in a service queue with other registrations. The ranking weight P is calculated for all service consumers 110 in the queue. Then the priority list is sorted based on the resulting priorities. As a service consumer 110 is linked with a service provider 105, the remaining service consumers 110 in the queue each have a registration position (R) decremented. For example, the service consumer 110 that was second on the queue is now first. In one embodiment the priorities (P) are only recalculated if a new service consumer 110 is added to the queue.

In one embodiment, if the weight W for a first service provider 105a meets the service threshold for the highest ranked service consumer 110 in the queue, the match module 315 matches 615 the first service provider 105a to the highest ranked service consumer 110, the calculations of Equation 2 may not be performed, and the method 600 ends. Otherwise, if the weight W for the first service provider 105a does not meet the service threshold for the highest ranked service consumer 110 in the queue, the match module 315 may calculate the ranking weight P for each service consumer 110. The match module 315 may further match 615 the service consumer 110 with a service provider 105 with the lowest ranking weight P, and the method 600 ends.

In one embodiment, the match module 315 may store the inputs to Equations 1 and 2 for each service provider 105. In addition, when a service provider 105 is matched to a service consumer 110, the match module 315 may remove the service consumer 110 from the queue and modify the advertisement 330 of the service provider 105 to reflect the change in service capabilities.

The present invention automatically exchanges services in a distributed system 100 by matching 525, 615 a service provider 105 to a service consumer 110. The present invention further configures 530 the service provider 105 and establishes a service relationship between the service provider 105 and the service consumer 110. Thus the present invention speeds the assignment of service providers 105, increasing the efficiency of the distributed system 100. A computing task need not be delayed while an administrator assigns service providers 105 to service consumers 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium comprising a computer readable program stored on a tangible storage device for exchanging services in a distributed system, wherein the computer readable program when executed on a computer causes the computer to:
   receive an advertisement of service capabilities for a service provider, wherein the advertisement of service capabilities comprises a storage, Network Attached Storage (NAS), compute, mirror, input/output (I/O), archival, and database service types;
   receive a registration of service requirements for a service consumer;
   determine if the advertisement service capabilities match the registration service requirements;
   configure the service provider to supply the service requirements of the service consumer if the advertisement service capabilities match the registration service requirements; and
   establish a service relationship between the service provider and the service consumer, wherein the service provider provides the service requirements of the service consumer.

2. The computer readable storage medium of claim 1, wherein the service type is selected from the storage, NAS, and archival types and the advertisement of service capabilities further comprises available storage, a number of clients that can be supported, a Redundant Array of Independent Disks (RAID) level, a logical location, and a physical location.

3. The computer readable storage medium of claim 2, wherein the advertisement of service capabilities further comprises a storage version number, an authentication value, and an availability value.

4. The computer readable storage medium of claim 3, wherein the advertisement of service capabilities further comprises a priority ranking of the available storage, the number of clients that can be supported, the RAID level, the logical location, and the physical location.

5. The computer readable storage medium of claim 4, wherein determining if the advertisement service capabilities match the registration service requirements comprises:
   determining each advertisement of a plurality of advertisements with service capabilities that match the registration service requirements;
   calculating a ranking weight for each matching advertisement using the priority ranking; and
   matching a matching advertisement with the highest ranking weight to the registration service requirements.

6. The computer readable storage medium of claim 1, wherein the service provider is a storage device disposed in a blade center and the service consumer is a server disposed in the blade center and the computer is a management module disposed in the blade center.

7. The computer readable storage medium of claim 1, wherein the service provider is a storage blade disposed in a first blade center and the service consumer is a server blade disposed in a second blade center and the computer is a director server in communication with the first and second blade centers.

8. The computer readable storage medium of claim 1, wherein the computer readable program is further configured to cause the computer to:
   determine the service capabilities of the service provider; and
   determine the service requirements of the service consumer.

9. An apparatus for exchanging services in a distributed system, the apparatus comprising:
   a computer readable storage medium storing a computer readable program;
   a processor executing the computer readable program, the computer readable program comprising:
   a communication module receiving an advertisement of service capabilities for a service provider, wherein the advertisement of service capabilities comprises a storage, Network Attached Storage (NAS), compute, mirror, input/output (I/O), archival, and database service types;
   the communication module receiving a registration of service requirements for a service consumer;
   a match module determining if the advertisement service capabilities match the registration service requirements;
   a configuration module configuring the service provider to supply the service requirements of the service consumer if the advertisement service capabilities match the registration service requirements; and an establishment module establishing a service relationship between the service provider and the service consumer, wherein the service provider provides the service requirements of the service consumer.

10. The apparatus of claim 9, wherein the service type is selected from the storage, NAS, and archival types and the advertisement of service capabilities further comprises available storage, a number of clients that can be supported, a RAID level, a logical location, a physical location, a storage version number, an authentication value, and an availability value.

11. The apparatus of claim 10, wherein the advertisement of service capabilities further comprises a priority ranking of the available storage, the number of clients that can be supported, the RAID level, the logical location, and the physical location.

12. The apparatus of claim 11, wherein the match module determines if the advertisement service capabilities match the registration service requirements by:
determining each advertisement of a plurality of advertisements with service capabilities that match the registration service requirements;
calculating a ranking weight for each matching advertisement using the priority ranking; and
matching a matching advertisement with the highest ranking weight to the registration service requirements.

13. A system for exchanging services in a distributed system, the system comprising:
a plurality of service providers;
a plurality of service consumers;
a manager comprising a computer readable storage medium storing a computer readable program executed by a processor and further comprising:
a communication module receiving a plurality of advertisements of service capabilities for the plurality of service providers, wherein the advertisement of service capabilities comprises a storage, Network Attached Storage (NAS), compute, mirror, input/output (I/O), archival, and database service types;
the communication module receiving a plurality of registrations of service requirements for the plurality of service consumers;
a match module determining if a first advertisement of service capabilities for a first service provider matches a first registration of service requirements for a first service consumer;
a configuration module configuring the first service provider to supply the first service requirements of the first service consumer if the first advertisement service capabilities match the first registration service requirements; and
an establishment module establishing a service relationship between the first service provider and the first service consumer, wherein the first service provider provides the service requirements of the first service consumer.

14. The system of claim 13, wherein the service type is selected from the storage, NAS, and archival types and the advertisement of service capabilities further comprises available storage, a number of clients that can be supported, a RAID level, a logical location, a physical location, a storage version number, an authentication value, an availability value, and a priority ranking of the available storage, the number of clients that can be supported, the RAID level, the logical location, and the physical location, and wherein the match module determines if the first advertisement service capabilities match the first registration service requirements by:
determining each advertisement of the plurality of advertisements with service capabilities that match the first registration service requirements;
calculating a ranking weight for each matching advertisement using the priority ranking; and
matching a matching advertisement with the highest ranking weight to the first registration service requirements.

15. The system of claim 13, wherein at least one service provider is a storage blade disposed in a first blade center and at least one service consumer is a server blade disposed in a second blade center and the manager is a director server in communication with the first and second blade centers.

16. The system of claim 13, wherein each service provider is a storage blade disposed in a blade center and each service consumer is a server blade disposed in the blade center and the manager is a management module disposed in the blade center.

17. A method for deploying computer infrastructure to exchange services in a distributed system, comprising integrating a computer readable storage medium comprising a computer readable program into a computing system, wherein the program executed by the computing system performs the following:
receiving an advertisement of service capabilities for a service provider, wherein the advertisement of service capabilities comprises a storage, Network Attached Storage (NAS), compute, mirror, input/output (I/O), archival, and database service types;
receiving a registration of service requirements for a service consumer;
determining if the advertisement service capabilities match the registration service requirements;
configuring the service provider to supply the service requirements of the service consumer if the advertisement service capabilities match the registration service requirements; and
establishing a service relationship between the service provider and the service consumer, wherein the service provider provides the service requirements of the service consumer.

* * * * *